United States Patent
Boyd (10) Patent No.: US 9,519,046 B2
(45) Date of Patent: *Dec. 13, 2016

(54) SYSTEM AND METHOD FOR DETERMINING SIGNAL SOURCE LOCATION IN WIRELESS LOCAL AREA NETWORK

(71) Applicant: ZIH CORP., Lincolnshire, IL (US)

(72) Inventor: Robert W. Boyd, Eidson, TN (US)

(73) Assignee: ZIH Corp., Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,389

(22) Filed: Jan. 6, 2016

(65) Prior Publication Data

US 2016/0116566 A1    Apr. 28, 2016

Related U.S. Application Data

(63) Continuation of application No. 11/668,569, filed on Jan. 30, 2007, now Pat. No. 9,274,207.

(Continued)

(51) Int. Cl.
*H04W 24/00* (2009.01)
*G01S 5/06* (2006.01)
(Continued)

(52) U.S. Cl.
CPC .................. *G01S 5/06* (2013.01); *G01S 5/021* (2013.01); *G01S 5/0215* (2013.01); *G01S 5/0221* (2013.01); *H04W 64/00* (2013.01); *H04W 84/12* (2013.01)

(58) Field of Classification Search
CPC ...... G01S 5/0215; G01S 5/021; G01S 5/0221; G01S 5/06; H04W 64/00; H04W 84/12
(Continued)

(56) References Cited

U.S. PATENT DOCUMENTS 5,056,106 A    10/1991    Wang et al.
5,119,104 A    6/1992    Heller
(Continued)

FOREIGN PATENT DOCUMENTS

EP    1180696    2/2002
EP    1263255    12/2002
(Continued)

OTHER PUBLICATIONS

International Search Report and Written Opinion issued Jun. 29, 2007 in connection with International Patent Application No. PCT/US2007/002533.

*Primary Examiner* — Wayne Cai (57) ABSTRACT

Systems and methods for determining signal source location in wireless local area networks are disclosed. An example method includes receiving, from a first signal reader, a first time-of-arrival measurement for a first radio frequency (RF) signal generated by a first wireless local area network (WLAN) signal source located at a first known location, the first time-of-arrival measurement being relative to a first clock of the first signal reader; receiving, from a second signal reader, a second time-of-arrival measurement for the RF signal, the second time-of-arrival measurement being relative to a second clock of the second signal reader, wherein the first clock is not synchronized with the second clock; defining a first time relationship between the first clock and a system time based on the first time-of-arrival measurement; and defining a second time relationship between the second clock and the system time based on the second time-of-arrival measurement.

20 Claims, 5 Drawing Sheets

Related U.S. Application Data (60) Provisional application No. 60/764,184, filed on Feb. 1, 2006.

(51) Int. Cl.
  *G01S 5/02* (2010.01)
  *H04W 64/00* (2009.01)
  *H04W 84/12* (2009.01)

(58) Field of Classification Search
  USPC .......................... 455/130–132, 456.1–456.6;
   340/572.1–572.4, 539.11, 539.13, 539.15,
   340/10.1, 10.3
  See application file for complete search history.

(56) References Cited

U.S. PATENT DOCUMENTS

| | | |
|---|---|---|
| 5,920,287 A | 7/1999 | Belcher et al. |
| 5,960,355 A | 9/1999 | Ekman et al. |
| 5,995,046 A | 11/1999 | Belcher et al. |
| 6,121,926 A | 9/2000 | Belcher et al. |
| 6,127,976 A | 10/2000 | Boyd et al. |
| 6,170,748 B1 | 1/2001 | Hash et al. |
| 6,249,252 B1 | 6/2001 | Dupray |
| 6,268,723 B1 | 7/2001 | Hash et al. |
| 6,275,705 B1 | 8/2001 | Drane et al. |
| 6,281,834 B1 | 8/2001 | Stilp |
| 6,300,903 B1 | 10/2001 | Richards et al. |
| 6,366,242 B1 | 4/2002 | Boyd et al. |
| 6,366,626 B1 | 4/2002 | Boyd |
| 6,380,894 B1 | 4/2002 | Boyd et al. |
| 6,393,045 B1 | 5/2002 | Belcher et al. |
| 6,522,890 B2 | 2/2003 | Drane et al. |
| 6,655,582 B2 | 12/2003 | Wohl et al. |
| 6,657,586 B2 | 12/2003 | Turner |
| 6,665,333 B2 | 12/2003 | McCrady et al. |
| 6,720,876 B1 | 4/2004 | Burgess |
| 6,812,839 B1 | 11/2004 | Belcher et al. |
| 6,859,485 B2 | 2/2005 | Belcher |
| 6,882,315 B2 * | 4/2005 | Richley .................... G01S 5/06 342/387 |
| 6,892,054 B2 | 5/2005 | Belcher et al. |
| 6,987,744 B2 | 1/2006 | Harrington et al. |
| 7,009,495 B2 | 3/2006 | Hughes et al. |
| 7,046,657 B2 | 5/2006 | Harrington et al. |
| 7,126,535 B2 | 10/2006 | Jenkins et al. |
| 9,395,432 B2 * | 7/2016 | Boyd ....................... G01S 5/10 |
| 2001/0030625 A1 | 10/2001 | Doles et al. |
| 2002/0059535 A1 | 5/2002 | Bekritsky et al. |
| 2002/0080759 A1 | 6/2002 | Harrington et al. |
| 2002/0118655 A1 | 8/2002 | Harrington et al. |
| 2002/0181565 A1 | 12/2002 | Boyd et al. |
| 2004/0046693 A1 | 3/2004 | Ogino et al. |
| 2005/0030160 A1 | 2/2005 | Goren et al. |
| 2005/0078626 A1 | 4/2005 | Ogino et al. |
| 2005/0193149 A1 | 9/2005 | Boyd |
| 2005/0280578 A1 | 12/2005 | Boyd |
| 2007/0167169 A1 | 7/2007 | Simons et al. |

FOREIGN PATENT DOCUMENTS

| | | |
|---|---|---|
| EP | 1396730 | 3/2004 |
| GB | 2330716 | 4/1999 |
| WO | 9921028 | 4/1999 |
| WO | 03075630 | 9/2003 |
| WO | 2007089778 | 8/2007 |

* cited by examiner

SYSTEM AND METHOD FOR DETERMINING SIGNAL SOURCE LOCATION IN WIRELESS LOCAL AREA NETWORK

RELATED APPLICATION

This patent arises from a continuation of U.S. patent application Ser. No. 11/668,569, filed Jan. 30, 2007, which claims the benefit of U.S. Provisional Patent Application No. 60/764,184, filed Feb. 1, 2006, which are hereby incorporated herein by reference in their entireties.

FIELD OF THE INVENTION

This invention relates to the field of wireless local area networks (WLAN), and more particularly, this invention relates to wireless local area networks that provide mobile device location and a location system for locating objects within a monitored environment.

BACKGROUND OF THE INVENTION

Wireless local area networks are becoming more commonplace as the use of portable computers, such as "laptop," "notebook," and "pen" computers become increasingly common in office environments and other locations. In most conventional wireless local area networks, a number of access point base stations form a cellular network for communicating with wireless mobile stations or other mobile devices. Each access point base station is typically connected to a network server, such as part of an ethernet or other network infrastructure. Any messages transmitted as wireless communication signals are first transmitted to an access point base station instead of transmitted along wireless stations. This type of centralized wireless communication using cells provides control over communications along existing wireless mobile devices. Typically, the wireless communication signals are a spread spectrum communications signal, for example, a direct sequence spread spectrum signal, or a frequency hopping spread spectrum signal.

Although wireless local area networks are becoming more commonplace in offices and similar environments, most wireless local area networks do not provide the capability of determining the location of a wireless mobile device or other signal source operating in the wireless LAN environment. Although some wireless LAN systems provide for signal strength analysis of spread spectrum signals to determine location, none of them provide an accurate means of determining the location of a mobile device operative within the wireless infrastructure defined by access point base stations.

Various types of wireless local area network systems that use location systems of the assignee are disclosed in U.S. Pat. Nos. 6,892,054; 6,987,744; and 7,046,657, the disclosures which are hereby incorporated by reference in their entirety. Much of the disclosure in these incorporated by reference patents rely on differential time-of-arrival (TOA) applications that receive a transmitted signal at multiple physical locations corresponding to a receiver to locate a tag transmitter. The clocks could be synchronized so that differences in the indicated time-of-arrival closely approximate the actual time-of-arrival difference. It would be advantageous if the location systems used in a wireless local area network could also determine differences in signal arrival times, for example, when receivers are unsynchronized to aid in locating signal sources such as signaling to receivers, for example, access points.

Commonly assigned U.S. Patent Publication Nos. 2005/0193149 and 2005/0280578, the disclosures which are hereby incorporated by reference in their entirety, are directed to a location system and method that achieves time synchronized network performance using unsynchronized receiver clocks and to achieving synchronized network performance with nodes divided into separate networks. A processor is operative with a receiver and determines clock timing relationships for the clocks based on one of at least propagation or processing delays in the receivers to synchronize receiver performance. These systems are not directed, however, to WLAN systems.

SUMMARY OF THE INVENTION

A system and method locates a signal source in a wireless local area network (WLAN). A wireless LAN signal as an RF signal is propagated from a WLAN signal source at a fixed, known location to a plurality of receivers having unsynchronized clocks. The time-of-arrival is measured at each receiver and the timing relationship from the fixed, known location of the WLAN signal source is used to relate time-of-arrival measurements from a signal arriving from a WLAN signal source at an unknown location.

A tag transmitter can be positioned at each WLAN signal source. Each tag transmitter can transmit an RF signal having data identifying an object to which the tag transmitter is associated.

In yet another aspect, each receiver can be formed as a wireless access point of the WLAN. A plurality of WLAN signal sources can be positioned at fixed, known locations. A tag transmitter can also be embedded at a receiver and operative as a WLAN beacon.

In yet another aspect, the processor can be operative for determining clock timing relationships for clocks based on one of at least the propagation or processing delays in the receivers for synchronizing receiver performance. Each WLAN signal source can include a circuit for transmitting a pseudorandom spread spectrum RF signal. A processor can be operative for processing first-to-arrive signals at each receiver.

In yet another aspect, a system locates a wireless station in communication with a wireless local area network (WLAN). A plurality of wireless mobile devices each form a WLAN signal source that transmits RF signals. A plurality of cells define a WLAN and each have a receiver forming an access point in the WLAN and adapted for communicating with WLAN signal sources. At least one WLAN signal source is positioned at a known location. A processor communicates with each receiver and measures at each receiver the time-of-arrival of the RF signal transmitted from the WLAN signal source at a known location and uses a timing relationship from the fixed, known location of the at least one WLAN signal source to relate time-of-arrival measurements from a signal arriving from a WLAN signal source at an unknown location within the WLAN.

A method aspect is also set forth.

BRIEF DESCRIPTION OF THE DRAWINGS

Other objects, features and advantages of the present invention will become apparent from the detailed description of the invention, which follows when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The system and method in accordance with non-limiting examples of the present invention, applies to location of signal sources, including wireless local area network (WLAN) clients, through the use of time-of-arrival (TOA) or differential TOA techniques. The signal are typically received at multiple (usually 3 or more) geographically separated points to support location of the source. Each receiver (e.g. WLAN access point) assesses the signal's TOA at its position, which supports subsequent source location via multilateration (e.g., trilateration).

The TOA measurements typically are accurate to within a time that supports the desired location accuracy. For locations to be accurate within a few feet, the TOA measurements typically should be accurate to within a very few nanoseconds. The system and method permits TOA measurements made at independent receivers to be related with accuracy sufficient to support location of the signal's source without requiring unusually precise receiver clocks (oscillators), synchronization of those clocks or broadcast of the receiver's clock count.

The TOA measurements can be made with respect to independent (randomly related) clocks contained in non-synchronized receivers and can be accurately related to each other if the receivers observe signals from sources at known locations.

In one non-limiting example of the present invention, a WLAN signal source is placed in a known fixed location that propagates directly to all participating receivers. Each receiver measures the TOA for transmissions from this reference source and communicates them to a central clock tracking service (hardware or software). Knowing how much time was required for the reference source's signal to propagate to each receiver, the tracking service can evaluate what time each receiver clock indicated when the source transmitted. By observing reference signals sufficiently often, the tracking service can determine a continuous relationship between the independent clocks. This relationship can then be used to accurately relate TOA measurements for signals arriving from unknown locations.

A plurality of reference tags could be used. In practice, it is often not possible to find a location for a single reference source that propagates reliably and directly to all receivers used for location. In this case, it is possible to use multiple reference sources at known locations. Receivers are considered to be directly connected if they reliably and directly receive signals from the same reference source. The clock tracking service will be able to accurately relate all TOA measurements if each pair of location receivers are connected to each other. Pairs are connected if it is possible to get from one to the other by following any number of direct connections.

Non-WLAN reference tags could be used. Clock tracking reference signals can be any signal that supports accurate assessment of its TOA at the location receivers. There is no requirement for the signal to be a WLAN signal. For example, reference tags could send a T371 compatible signal to be used for clock tracking.

Embedded or bidirectional reference tags could also be used. A particularly useful situation is when the reference signal is generated at instants that are known relative to one of the clocks that is tracked. One example has the reference signal generated by a transmitter embedded in the receiving equipment (e.g., a WLAN beacon). A closed loop exists between any pair of receivers that contain embedded reference tags. Having a closed loop allows direct measurement of propagation delay and does not rely on assumptions of reference tag position and direct propagation. In some instances, however, WLAN equipment cannot determine the transmission time of its own beacon signal. As a result, some new capability may be required to support this closed loop clock tracking feature.

It should be understood that if the reference tag transmitters are two-way and embedded or co-located with receivers, the clock tracking service can perform its function without knowledge of the tag transmitter's position, i.e., without knowing the expected propagation delay. The two-way feature allows accurate determination of propagation delay even if it is not line-of-sight provided it is the same in their direction. By two-way, it signifies that the tag in each sensor of any particular pair can be received by both sensors or receivers. This includes situations, for example, as propagation over cables between sensors where the length or delay is unknown.

It is possible to use small pulses for the wireless LAN signal. As noted before, it is not always necessary to know processing and propagation delays. It should be understood that wireless LAN signals are typically used and no other signals are necessary in some cases. If the system determines that the bidirectional propagation is the same in either direction, it is not necessary to know about delays.

Figure 1:
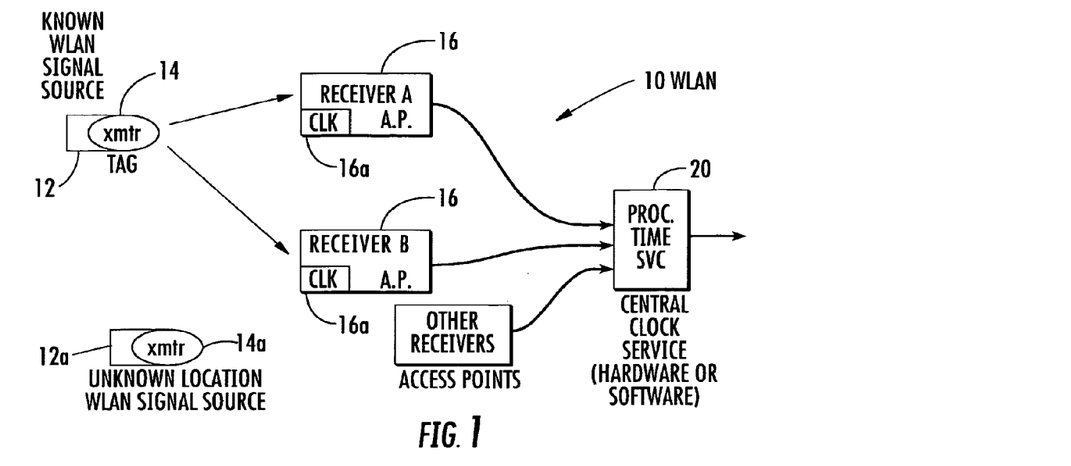
FIG. 1 is a block diagram showing an example of components that could be used with the location system of the present invention and showing unsynchronized receivers that receive an RF signal from a tag transmitter in a wireless local area network (WLAN) where information is forwarded to a processor operative as a time service.

For purposes of description, a location system that could be modified for use with the present invention is described with reference to FIG. 1, showing a WLAN environment. As shown in the non-limiting example of FIG. 1, the WLAN environment 10 includes a number of assets as WLAN signal sources 12, 12*a* having wireless tag transmitters 14, 14*a* associated therewith. The assets 12, 12*a* could be a personal computer, PDA or other wireless signal source, such as an item of inventor in a manufacturing environment. For example, the WLAN environment 10 could include mobile computers and fixed computers as assets or objects 12 that include tag transmitter 14 functionality built-in. WLAN signal source 12a and tag transmitter 14a are at an unknown location.

A number of signal readers 16 as receivers for access points are contained within the environment, for example, a manufacturing floor, and act as tag signal readers (receivers) for receiving signals from the wireless tag transmitters. Each signal reader 16 of a receiver includes a receiver clock 16a, which can be unsynchronized.

The tag signal readers 16 could be associated with an access point base station of a wireless local area network. The signals transmitted by the wireless tag transmitters 14 can be wideband, spread spectrum signals and, in one aspect, a timing marker could be appended a predetermined time in front of the wideband, spread spectrum signal for indicating the presence of the wideband, spread spectrum signal. A location processor 20 is operative as a time service and can be implemented by hardware or software. It is operatively coupled to the tag signal readers as access points, such as by a wireless communication system or a wired connection, for detecting the signals or timing markers of signals. Whether a timing marker is used or not, the processor 20 can correlate a signal as first-to-arrive signal and conducts differentiation of first-to-arrive signals to locate a wireless transmitter. If a timing marker is used, it could be timed about 80 to about 120 nanoseconds in front of the wideband, spread spectrum signal.

Much of the technology and detection capability as described can use circuitry and algorithms described in the commonly assigned and incorporated by reference patents and published patent applications listed above. The circuitry described in these references can be modified for use with system and method for achieving time synchronized network performance even when receiver clocks are unsynchronized.

Figure 2:
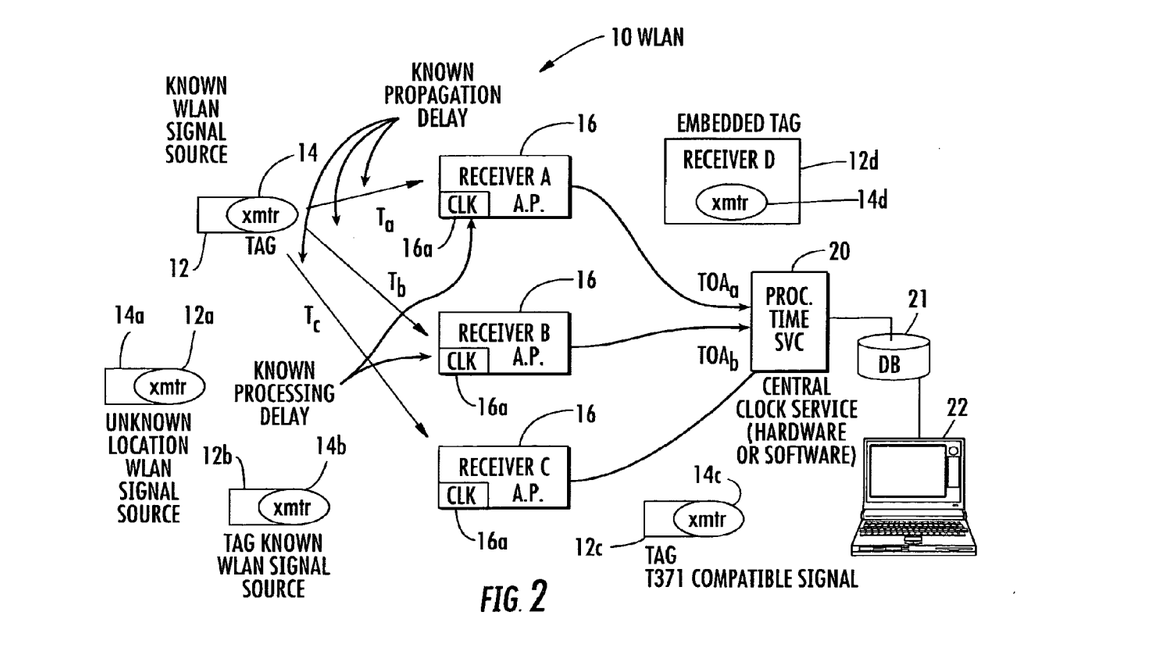
FIG. 2 is a block diagram similar to FIG. 1, but showing the time-of-arrival information that is forwarded to the processor as a time service, including the processing of known propagation and processing delays within the WLAN in accordance with a non-limiting example of the present invention.

FIG. 2 shows further details of the WLAN environment 10 that also includes another signal source 12b and tag 14a as a known WLAN signal source for having two known reference WLAN signal sources 12, 12b. Another object 12c includes a tag 14c that could be a T371 compatible signal. Another signal source 12d includes an embedded tag shown at 14d. A third receiver C is illustrated.

A database 21 is operatively connected to the processor 20 and could be accessible by a personal computer 22 or other workstation, and be used for providing data updates, control over the system or viewing the operation of the system. For example, the computer workstation tool could be used as disclosed in commonly assigned U.S. Pat. No. 6,366,242. This '242 patent is hereby incorporated by reference in its entirety.

Although operation of tag transmitters can vary depending on the type of circuitry chosen by those skilled in the art, a tag transmitter transmits wideband (spread spectrum) pulses of radio frequency energy that are encoded with information, such as that representative of the identification of the object, and other object-associated information stored in a memory. A timing marker could precede the pulse as a preamble.

Each tag transmitter can have a unique internal identification number that is transmitted via radio frequency and could also be read with a bar code scanner, if necessary. This could allow seamless integration of a bar code system with a location system. The tag transmitter could include a memory having a read/write memory that acts as a portable data file to carry data between various environments and provide a field accessible, distributed database. The frequency range can vary, but as one non-limiting example, it could be about 2.4 to about 2.483 GHz. The typical read range can range from about 350 feet to greater than 1,000 feet in some instances, and even greater depending on the type of system and transmitter.

The tag signal readers or receivers 16 can be operative as network nodes, and include an active receiver and antenna array in some examples that capture spread spectrum radio signals from the tag transmitters. They are typically installed in a grid pattern to provide complete coverage to a site. They can be mounted from as little as 250 feet apart to as much as 750 feet apart and even greater distances.

Although mutually diverse antenna are illustrated, it is also possible that an omni-directional, circularly polarized antenna could be used as noted in some of the aforementioned and incorporated by reference patents and published patent applications. This would allow a tag signal reader to receive signals from any direction and provide hemispherical coverage within an environment to maximize response to the horizon and diminish response by several decibels to signals arriving from a vertical (downward) direction, which could be advantageous in some cases. The use of mutually diverse antennas, on the other hand, obviates some multipath based fades and nulls. It is also possible to incorporate configuration and/or sensitivity diversity into the antennas, such as by using orthogonally polarized antennas.

It is possible that the relationship between unsynchronized receivers 16 as access points can be determined by having the receivers observe the same radio frequency (RF) signal. There may be nothing special about this RF signal, or it could include a unique characteristic, for example, sent from a known location. In either case, the receivers 16 as access points would not have to perform special processing for this RF signal.

Each receiver 16 as an access point determines the signal's time of reception noting its own clock 16a and sends its clock information to the central processor 20, which is also operative as a "time service" as noted before. These signals can be sent by any convenient means, i.e., over a wired or wireless Local Area Network (LAN).

In this example, clocks 16a in each receiver 16 are free running, i.e., completely unsynchronized. The processor 20 is operative as a time service and discovers relationships between these clocks 16a and adjusts indicated arrival times appropriately, creating the illusion of time-synchronized receivers 16. Using these common observations, the processor 20 learns how to relate the times indicated by each receiver clock to every other receiver's clock.

Consequently, rather than synchronizing each receiver 16, the processor adjusts the indicated TOA's to reflect what would have resulted if the clocks 16a had been synchronized. These adjustments are reevaluated as often as necessary to preserve the required accuracy of the time relationships.

If the difference in propagation and/or processing delays are known, as illustrated in FIG. 2, the processor 20 operative as a time service can use the two time stamps to determine a pair of clock indications, for example, a clock A value and a clock B value corresponding to the same time. Additionally, two time-separated transmissions allow determination of differential clock rate and three transmissions indicate differential rate change. Consequently, the processor builds and maintains a model of the relationship between the two clocks.

The relationships between the receiver clocks 16a can be derived from common observations of an event, e.g., receptions of the same signal at multiple receivers. These events as signals may or may not be specially created for timing purposes.

Fundamental relationships for this description are:

$T_x$=time of signal transmission by reference (actual time; unknown);

$T_a$=propagation delay to + processing delay of receiver A (known);

$T_b$=propagation delay to + processing delay of receiver B (known);

$TOA_a$=time of arrival at receiver A (as indicated by clock A; measured);

$TOA_b$=time of arrival at receiver B (as indicated by clock B; measured);

If propagation delay is small enough, which is often the case in some applications, it is known that at time $T_x$ the clock in receiver A indicates $(TOA_a-T_a)$ and the clock in receiver B indicates $(TOA_b-T_b)$.

Relating $T_x$ to actual time requires additional information. However, relative knowledge is sufficient for the processor as a time service to determine time-of-arrival differences for other signals, i.e., to be located, if the clocks count at the same rate. By observing a second reference transmission some time later, the processor as a time service can determine the difference in clock rates between both receivers A and B.

By making N transmissions spaced in time, the time server is able to determine an $(N-1)^{st}$ order polynomial relating the two independent clocks. By making the process continuous, every transmission after first N allows the processor as a time service to update its clock relationship equation. This continually tracks the changes in the clock relationships over time.

Repetitive receptions of a signal transmitted from a known location allows the processor to determine an equation relating one receiver's indicated time (clock) to another receiver's indicated time (clock) and track changes in that relationship over time.

In some cases, it is desirable that a reference tag transmitter be at a position where the propagation delay to multiple receivers is constant and known. Typically this means the tag transmitter is located at a known location and has direct line-of-sight propagation to the receivers.

Tag transmitters can be used, however, even if their location is unknown. Fixed location tags can be referred to as reference tags. One technique is to use a pair of tag transmitters with known differential propagation delay to multiple receivers. This still requires line-of-sight propagation to the receivers but removes the requirement of knowing their location. An additional benefit is that knowing the receiver processing delay is no longer required. Instead, the value can be essentially constant from receiver to receiver.

A particularly useful implementation is when the tag transmitters are co-located with the receivers. In this case, the only requirement is that propagation is reciprocal, that is, the propagation delay from the transmitter at receiver A to receiver B is the same as the propagation delay from the transmitter at receiver B to receiver A.

It is possible that the processor as a time service can operate with no fixed reference signals by exploiting over-determination. A general differential time-of-arrival (DTOA) location solution may require K observations to solve in K-1 physical dimensions. When more than K receivers detect the signal, the additional information can be used as if the transmitter were a reference signal. An over-determined location system can maintain the time service function without any signals generated specifically for system timing.

It is also possible to avoid quadratic computational complexity. For example, a system having M receivers usually maintains $M*(M-1)/2$ clock pair relationships, which rapidly becomes computationally prohibitive as system size grows. It is possible to avoid having the number of tracking loops, maintained by the processor as the time service, grow quadratically with the number of receivers in the system. This is accomplished by defining a system time.

Each clock can be tracked with respect to a system time. This results in a linear relationship between time service complexity and system size. System time has little meaning relative to measuring TOA differences, but has greater significance in making implementation of a time service feasible.

System time can be imaginary. It only needs to be close enough to actual time that the difference is indistinguishable over a typical signal propagation delay. One possibility is to define system time as the mean or median of all receivers' clocks. System time can also be significant because it can be made to correspond to some time standard. For example, system time can be defined to be whatever a particular receiver's clock indicates. Another example is to equate it to a local reference clock, perhaps internal to the time service's host. Alternatively, it may be tied to an external standard such as GPS. Relating receiver clocks to an arbitrary system time makes time service complexity grow only linearly with respect to system size.

Figure 3:
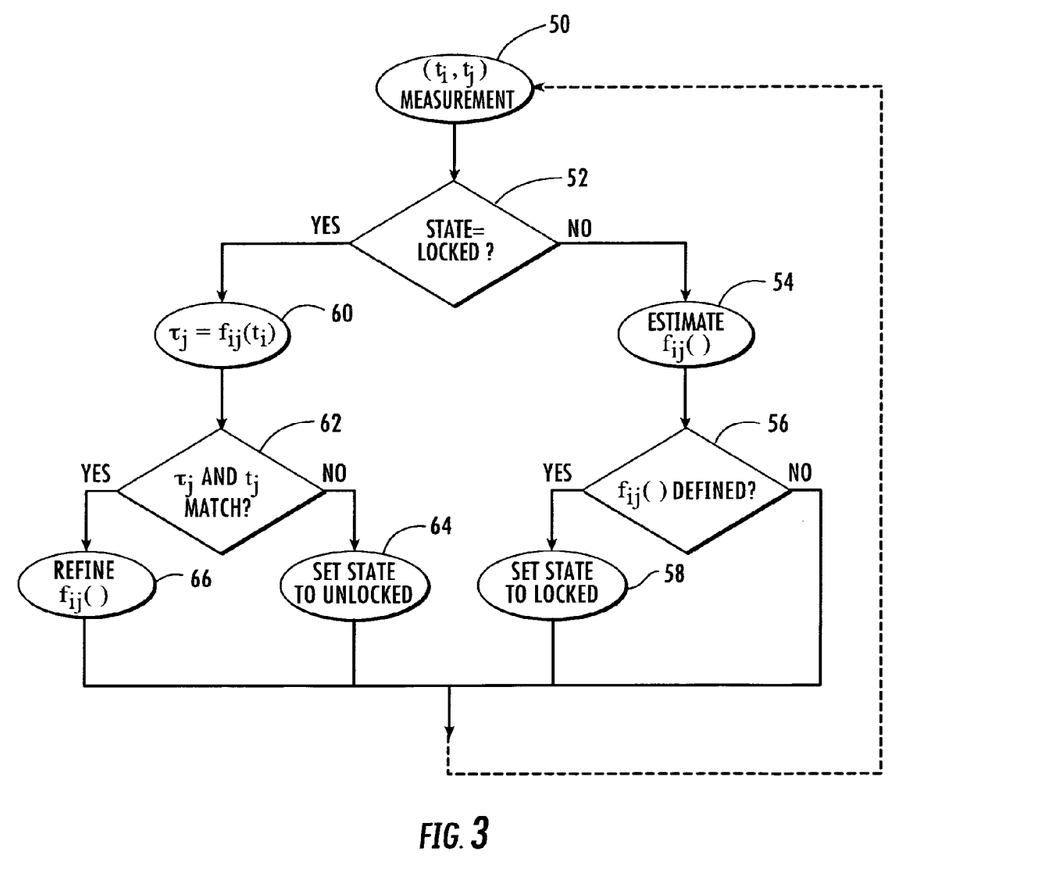
FIG. 3 is a high-level flow chart showing a clock tracking loop that can be used in the present invention.

The processor as time service can create and maintain a function that describes how the clocks in two independent units are related to each other. It is a straightforward extension to relate all clocks to each other and provide the relationship between clock pairs. This can be accomplished by a clock tracking loop, such as shown in FIG. 3.

The information provided as inputs to the loop are pairs of times $(t_i, t_j)$, which imply that when the $i^{th}$ clock indicated time $t_i$ the $j^{th}$ clock indicated time $t_j$. This information comes from measuring the time-of-arrival $(toa_k)$ of a signal (generated from a known location) at both sensor i and sensor j. In this example, since the location of a tag transmitter and both sensors are known, the time required for the signal to propagate to each sensor $(p_k)$ can be determined. Thus, at the time the signal was generated, the clock in sensor i indicated time $toa_i-p_i$ and the clock in sensor j indicated time $toa_j-p_j$, producing the desired $(t_i, t_j)$ pair as $(toa_i-p_i, toa_j-p_j)$.

There is a functional relationship. For example, it is possible to assume a cubic function as an example of a clock relationship, $f_{ij}(\ )$, that is:

$$f_{ij}(t)=c_3t^3+c_2t^2+c_1t+c_0$$

The four equation coefficients, $c_k$, can be determined after four time pairs have been received. The tracking loop shown in FIG. 3 shows how these coefficients may be refined (updated) as the relationship between the individual clocks varies.

Every time a $(t_i, t_j)$ pair is measured the loop is iterated. The loop is considered to be locked if the relationship, $f_{ij}(\ )$, is defined. If not locked, the loop simply collects a number of measurements sufficient to determine the relationship. If locked, the expected value for $t_j$ (denoted as $\tau_j$ in FIG. 3) is computed. The tracking error $(t_j-\tau_j)$ is determined and compared to a threshold. If the error is overly great, the loop is considered to have become unlocked. Otherwise, the error is used to refine $f_{ij}(\ )$ that is, to track the changes in the clock relationship that occur naturally over time.

The flowchart of FIG. 3 illustrates this logic. Inputs ($t_i$, $t_j$) (block 50) are input and a decision is made whether the state=locked (block 52). If not, the estimate $f_{ij}$ ( ) is made (block 54). A decision is made whether $fi_j$ ( ) is defined (block 56). If not, the loop returns. If yes, the state is set to lock (block 58) and the loop could then later repeat. If at block 52 the state is located, $T_j = f_{ij}(t_i)$ (block 60), a decision is made whether $\tau_j$ and $t_j$ match (block 62). If not, the state is set to an unlocked position (block 64). If yes, refine $f_{ij}$ ( ) (block 66).

It is also possible to achieve time synchronized network performance with receivers that are positioned such that some form a loosely connected network with tightly coupled receivers.

The WLAN system shown with respect to FIGS. 4-7 can be used and modified for use with the system and method of the present invention. Such system is described in detail in commonly assigned U.S. Pat. No. 6,892,054, the disclosure which is hereby incorporated by reference in its entirety.

Figure 5:
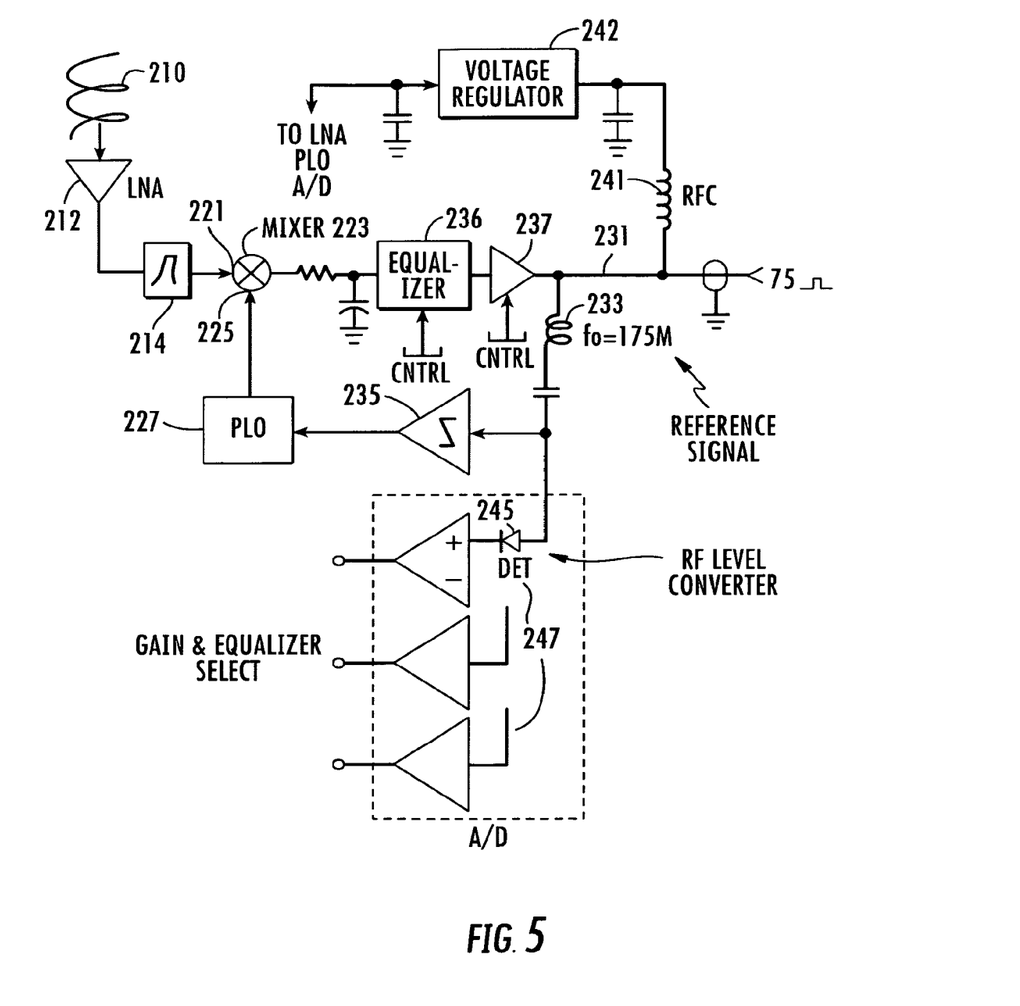
FIG. 5 is a high-level block diagram of an example of a circuit architecture that can be used as part of a processor for determining first-to-arrive signals.
Figure 6:
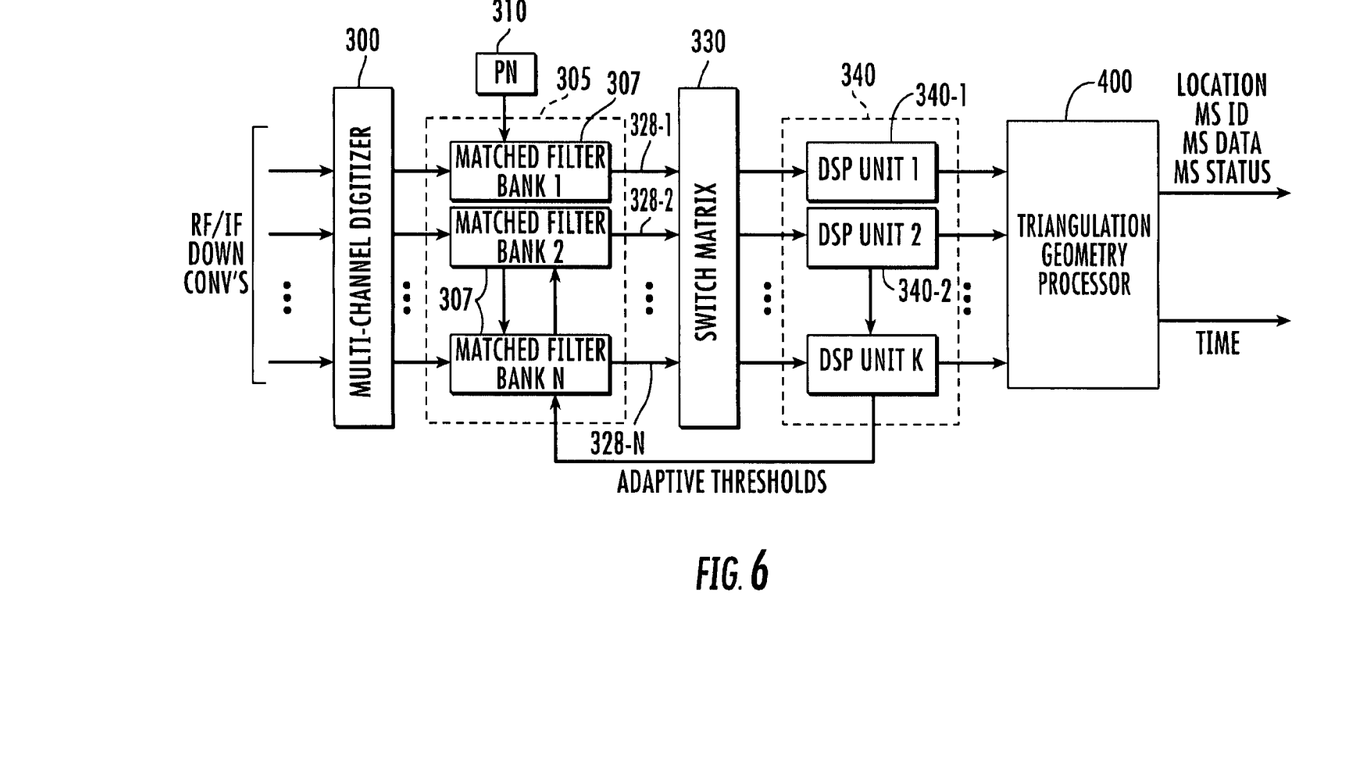
FIG. 6 is another high-level block diagram of an example of the circuit architecture that can be used with the present invention for correlation-based RF signal processors.

As will now be described in detail, relative to the overall system shown in FIG. 4 and more detailed circuit structures shown in FIGS. 5 and 6. A location system as used with a wireless local area network and a tag location system (FIG. 4) is described. FIGS. 5 and 6 show representative circuits and algorithms as also disclosed in the incorporated by reference patents that can be used with the present invention. Further details of such circuits are found in one or more of commonly assigned U.S. Pat. Nos. 5,920,287; 5,995,046; 6,121,926; 6,127,976; 6,657,586; 6,812,839; and U.S. Published Patent Application No. 2002/0181565, the disclosures which are hereby incorporated by reference in their entirety.

Figure 4:
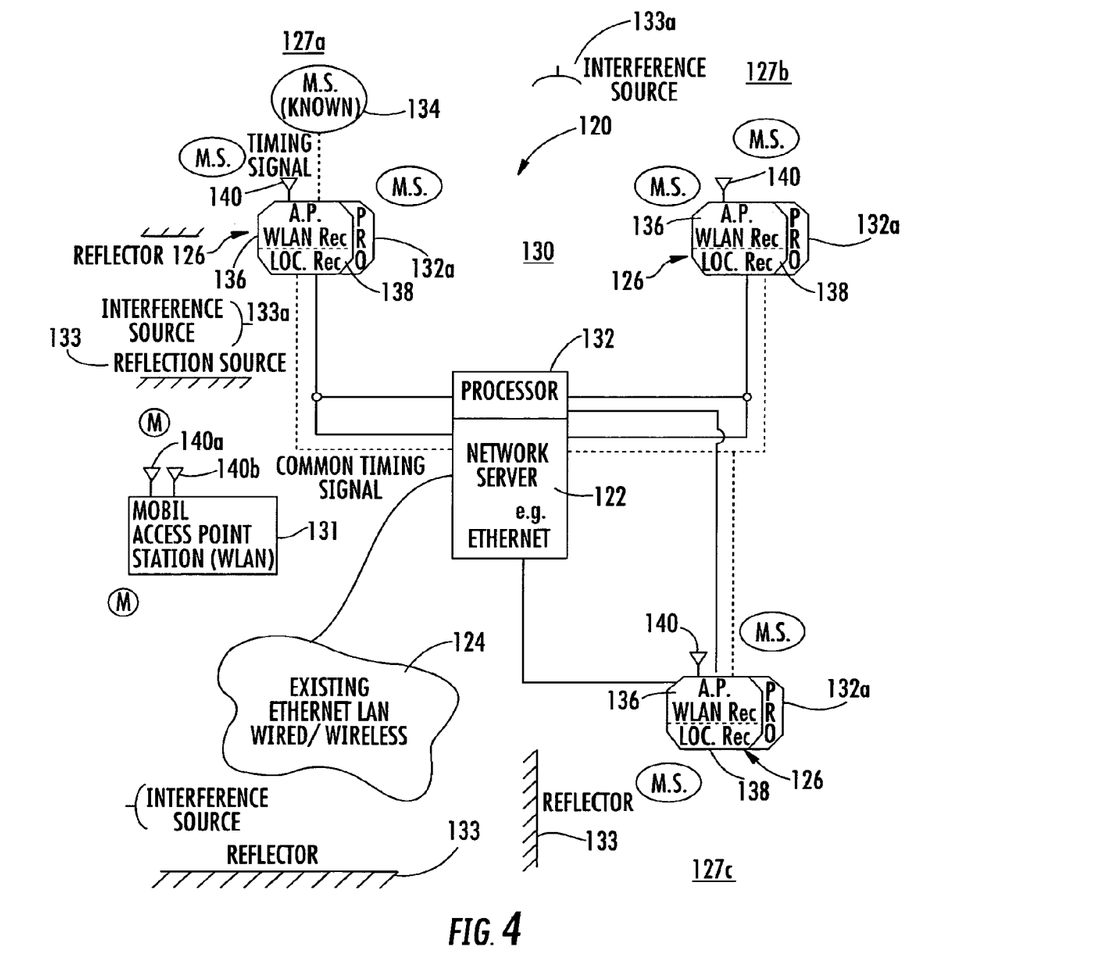
FIG. 4 is an overall system diagram of a wireless local area network using a location system that can be modified for use with the present invention.

FIG. 4 illustrates a high-level block diagram of a WLAN system 120 that can be modified for use with the present invention and showing a network server 122 that is part of an Ethernet local area network 124. A plurality of access point base stations 126 each define a cell (shown as 127a, 126b, 127c) as part of a wireless local area network 130 that communicates with wireless mobile stations (MS) using wireless communication signals that are spread spectrum wireless communication signals. A single mobile access point station 131 is illustrated, although a plurality of such stations could be used in the system. Reflecting surfaces 133 are illustrated and usually are an annoying determent to the system. Another antenna 133a is an interference source.

A processor 132 is operatively connected to each of the access point base stations (both fixed and wireless) and operative to process communication signals transmitted from a mobile station and determine which signals are first-to-arrive signals, typically based on a common timing signal. A location processor conducts differentiation of the first-to-arrive signals to locate the mobile station. A processor 132a is incorporated with each access point base station in one aspect. A common timing signal can be applied to each access point base station (and to processor 132 and/or 132a) and could be provided by a wireless timing signal broadcast to each of the access point base stations, such as by a mobile station (MS) located at a known location 134a or an access point base station that provides the common timing signal. A common timing signal can be supplied through a common bus, such as part of the Ethernet structure.

Mobile and/or fixed access point base stations 126, 131 each have a wireless local area network (WLAN) receiver 136 for receiving communications signals. A separate location receiver 138 could be used for receiving separate location pulses. Processors 132 and/or 132a can determine which signals are first-to-arrive signals and conduct differentiation of the first-to-arrive signals to locate the mobile station. The receiver 136 can operate from the same antenna 140 or can operate in dual diversity using two antennae 140a, 140b, as shown with the mobile access point station 131.

Each access point station could also include a plurality of mutually diverse antennas used in locating a mobile access point station or mobile station. A communication signal could include a separate location packet or pulse. The location determination could occur by processing part of the normal data or by processing packets that are used specifically for locating the mobile access point station.

A communication signal transmitted from a mobile access point station 122 could include a spread spectrum location pulse appended to the wireless communication signal that could be of short duration, typically less than a one millisecond, spread spectrum transmission as a location pulse, which is distinct and different from the wireless local area network communication signal. This location pulse could be appended to the falling edge of the wireless communication signal or appended to the beginning or rising edge of the communication signal.

The mobile devices or stations in communication with a mobile access point station or mobile station could transmit location data as appended pulses as forth in commonly assigned U.S. Published Patent Application No. 2002/0080759, the disclosure which is hereby incorporated by reference in its entirety. A mobile access point station could also add any signaling and location information as determined by those skilled in the art. Although direct sequence spread spectrum communication signals are preferred, different spread spectrum signals could be used, including any type of location pulse, frequency hopping, chirp or other spread spectrum signal techniques. Location transmitters and location receivers with appropriate communication circuitry, as set forth in the incorporated by reference patents and copending patent application, can be included as part of any mobile station or access point station as determined by those skilled in the art. It is also possible to use a network management station (MMS) operative under simple network management protocol (SNMP) and operative with a management information base (MIB). The positive characteristics for objects corresponding to access point stations and other devices associated with a wireless local area network system could allow management control by a network management station.

Referring now to FIGS. 5 and 6, a representative circuit and algorithm as described in the above mentioned and incorporated by reference patents are disclosed and set forth in the description below to aid in understanding the type of location system that can be used for determining which communication signals are first-to-arrive signals and how the processor conducts differentiation of the first-to-arrive signals to locate a mobile station, TAG, access unit or other device. This processor (or an associated processor) could also be operative for weighting the delayed versions of at least one interference signal by controlling amplitude and phase with weighted functions $W_1, W_2 \ldots W_n$ and summing weighted replicas to determine an approximation of the dispersed interference for cancelling interference.

FIG. 5 diagrammatically illustrates one type of circuitry configuration of a respective architecture for "reading" associated communication signals or a pulse (a "blink") used for location determination signals, such as signals emitted from a mobile station (M), a TAG, or a mobile access point station that is to be located. An antenna 210 senses appended transmission bursts or other signals from the mobile access point station to be located. The antenna in this aspect of the invention could also be omnidirectional and circularly polarized and coupled to a power amplifier 212, whose output is filtered by a bandpass filter 214. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and applied to communication cable 231 through a communication signal processor, which could be an associated processor as described before. The communication cable 231 also supplies DC power for the various components of the location receiver by way of an RF choke 241 to a voltage regulator 242, which supplies the requisite DC voltage for powering an oscillator, power amplifier and analog-to-digital units of the receiver.

The amplitude of the (175 MHZ) reference frequency supplied by the communications control processor to the phase locked local oscillator 227 implies the length of any communication cable 231 (if used) between a location processor and a receiver, such as if part of an access point station or other device. This magnitude information can be used as control inputs to equalizer 236 and current amplifier 237, so as to set gain and/or a desired value of equalization, that may be required to accommodate any length of a communication cable (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

FIG. 6 diagrammatically illustrates the architecture of a correlation-based, RF signal processor circuit as part of a processor to which the output of a respective RF/IF conversion circuit of FIG. 5 can be coupled for processing the output and determining location. The correlation-based RF signal processor correlates spread spectrum signals detected by an associated receiver with successively delayed or offset in time (by a fraction of a chip) spread spectrum reference signal patterns, and determines which spread spectrum signal received by a receiver of an access point station is the first-to-arrive corresponding to a location pulse or communications signal from the transmitter of a mobile access point station as part of the communications signal that has traveled over the closest observable path between a mobile access point station and the fixed location access point station or TAG and spaced monitoring receiver.

Because each receiver can be expected to receive multiple signals from the mobile access point station or other mobile device or TAG due to multipath effects caused by the signal transmitted by the mobile access point station or other device being reflected off various objects/surfaces between the mobile access point station and the receiver of other known access point stations 20, the correlation scheme ensures identification of the first observable transmission, which is the only signal containing valid timing information from which a true determination can be made of the distance from the station to the receiver.

For this purpose, as shown in FIG. 6, the RF processor employs a front end, multi-channel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by the PN spreading sequence generator of the location transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . , 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-$i$ of the set of digital signal processing units 340. The mobile access point station can "blink" or transmit location pulses randomly, and can be statistically quantified, and thus, the number of potential simultaneous signals over a processor revisit time could determine the number of such "on-demand" digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path)

detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 uses a standard multi-lateration algorithm that relies upon time-of-arrival inputs from at least three detectors of the access point stations 20 or other devices to compute the location of the mobile access point station 22, or in other embodiments, locate a TAG or mobile station, such as a cellular phone, pager or other device. The algorithm may be one which uses a weighted average of the received signals. In addition to using the first observable signals to determine object location, the processor also can read any data read out of a memory for the mobile access point station (or mobile device or other device if applicable) and superimposed on the transmission. Object position and parameter data can be downloaded to a database where object information is maintained. Any data stored in a mobile station memory may be augmented by altimetry data supplied from a relatively inexpensive, commercially available altimeter circuit.

It is also possible to use an enhanced circuit as shown in the incorporated by reference '926 patent to reduce multi-path effects, by using dual antennae and providing spatial diversity-based mitigation of multipath signals. In such systems, the antennas of each location receiver at an access point station are spaced apart from one another by a distance that is sufficient to minimize destructive multipath interference at both antennas simultaneously, and also ensure that the antennas are close enough to one another so as to not significantly affect the calculation of the location of the object by the downstream multi-lateration processor.

The multi-lateration algorithm executed by the location processor 24 can be modified to include a front-end subroutine that selects the earlier-to-arrive outputs of each of the detector pairs as the value to be employed in the multi-lateration algorithm. A plurality of auxiliary "phased array" signal processing paths can be coupled to the antenna set (e.g., pair), in addition to the paths containing the directly connected receivers and their associated first arrival detectors that feed the triangulation locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of detection processors. The partitioned detection processors are coupled in turn through distributed association processors to multiple location processors. For mobile access point station (or mobile device) detection capability, each receiver could also be equipped with a low cost omni-directional antenna, which provides hemispherical coverage within the monitored environment.

A detection processor filters received energy to determine the earliest time-of-arrival energy received for a transmission, and thereby minimize multi-path effects on the eventually determined location of a mobile device. The detection processor demodulates and time stamps all received energy that is correlated to known spreading codes of the transmission, so as to associate a received location pulse with only one mobile. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

The flow control mechanism uses an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for an individual mobile access point station (or other mobile or location device) to a single destination location processor, the association communication process of the communication framework may employ the same information and processing load distribution algorithm executed by the detection communication process of the communication framework. Each location processor determines the geographical location of a mobile access point station (or other mobile or location device) using the time-of-arrival measurement information originally sourced from the detection processors. The specific algorithm employed for location determination matches the number of arrival time measurements with whatever a priori information is available.

To locate a mobile access point station (or other mobile device or TAG), a processor may employ all available diversity information associated with the mobile of interest, including, but not limited to the station ID (if any), any data contained in the transmission and metrics indicating confidence it these values. It then forwards a location report containing this information over a location communication process to an asset management database. A location estimate may be derived from the measured time-of-arrival information in a received association report packet, using a differential time-of-arrival algorithm, such as a hyperbolic geometry-based function.

It is also possible to use a wireless local area network (WLAN) spread spectrum waveform to perform a geolocation function. The assumption is that the wireless communication signal, as a spread spectrum signal, has a high signal-to-noise ratio with reasonable power levels. The leading edge of this communication signal can be detected to a high accuracy and this information used with the algorithms as described before to provide relative time of arrival information for subsequent processing. It is possible to use edge detector circuitry as part of an access point station having a wireless local area network (WLAN) receiver. It is also possible to have a timing signal from a known location or unknown location. Other component locations could be known, of course. For example, some wireless local area network (WLAN) transmitters have known locations to enable the use of the algorithm when an access point station or other mobile station or device location is known.

It is also known that the communications signal as a spread spectrum communications signal can have sufficient bandwidth to provide useful time accuracy. For example, a 50 MHz bandwidth could provide approximately 5 nanoseconds of timing accuracy that is about 5 feet of accuracy using much of the technology and teachings described before. It is possible to use a correlator operative as a functional spread spectrum matched filter to enable a higher quality estimate with integration over many chips of the spread spectrum transmission. It is possible to use a matched filter that spans multiple symbols and improves accuracy by collecting more energy in the filter prior to leading edge detection.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

What is claimed is:

1. A method, comprising:
    receiving, from a first signal reader, a first time-of-arrival measurement for a first radio frequency (RF) signal generated by a first wireless local area network (WLAN) signal source located at a first known location, the first time-of-arrival measurement being relative to a first clock of the first signal reader;
    receiving, from a second signal reader, a second time-of-arrival measurement for the RF signal, the second time-of-arrival measurement being relative to a second clock of the second signal reader, wherein the first clock is not synchronized with the second clock;
    defining, via a processor, a first time relationship between the first clock and a system time based on the first time-of-arrival measurement; and
    defining, via the processor, a second time relationship between the second clock and the system time based on the second time-of-arrival measurement.

2. A method as defined in claim 1, further comprising executing a function to define a third time relationship between the first clock and the second clock.

3. A method as defined in claim 2, further comprising executing a tracking loop to maintain the third time relationship.

4. A method as defined in claim 3, wherein executing the tracking loop comprises:
    calculating an expected value of the first clock at a first time;
    calculating a tracking error based on the expected value; and
    comparing the tracking error to a threshold.

5. A method as defined in claim 4, wherein executing the tracking loop comprises, when the tracking error exceeds the threshold, unlocking the tracking loop and estimating the function.

6. A method as defined in claim 4, wherein executing the tracking loop comprises, when the tracking error does not exceed the threshold, refining the function to track any change in the third time relationship.

7. A method as defined in claim 1, further comprising defining the system time as one of a mean of the first clock and the second clock, a median of the first clock and the second clock, an internal clock associated with the processor, or an external standard.

8. An apparatus, comprising:
    memory including machine-readable instructions; and
    a processor to execute the machine-readable instructions to perform operations comprising:
        receiving, from a first signal reader, a first time-of-arrival measurement for a first radio frequency (RF) signal generated by a first wireless local area network (WLAN) signal source located at a first known location, the first time-of-arrival measurement being relative to a first clock of the first signal reader;
        receiving, from a second signal reader, a second time-of-arrival measurement for the RF signal, the second time-of-arrival measurement being relative to a second clock of the second signal reader, wherein the first clock is not synchronized with the second clock;
        defining a first time relationship between the first clock and a system time based on the first time-of-arrival measurement; and
        defining a second time relationship between the second clock and the system time based on the second time-of-arrival measurement.

9. An apparatus as defined in claim 8, wherein the operations further comprise executing a function to define a third time relationship between the first clock and the second clock.

10. An apparatus as defined in claim 9, wherein the operations further comprise executing a tracking loop to maintain the third time relationship.

11. An apparatus as defined in claim 10, wherein executing the tracking loop comprises:
    calculating an expected value of the first clock at a first time;
    calculating a tracking error based on the expected value; and
    comparing the tracking error to a threshold.

12. An apparatus as defined in claim 11, wherein executing the tracking loop comprises, when the tracking error exceeds the threshold, unlocking the tracking loop and estimating the function.

13. An apparatus as defined in claim 11, wherein executing the tracking loop comprises, when the tracking error does not exceed the threshold, refining the function to track any change in the third time relationship.

14. An apparatus as defined in claim 8, wherein the operations further comprise defining the system time as one of a mean of the first clock and the second clock, a median of the first clock and the second clock, an internal clock associated with the processor, or an external standard.

15. A machine-readable storage device comprising instruction that, when executed, cause a machine to at least:
receive, from a first signal reader, a first time-of-arrival measurement for a first radio frequency (RF) signal generated by a first wireless local area network (WLAN) signal source located at a first known location, the first time-of-arrival measurement being relative to a first clock of the first signal reader;
receive, from a second signal reader, a second time-of-arrival measurement for the RF signal, the second time-of-arrival measurement being relative to a second clock of the second signal reader, wherein the first clock is not synchronized with the second clock;
define a first time relationship between the first clock and a system time based on the first time-of-arrival measurement; and
define a second time relationship between the second clock and the system time based on the second time-of-arrival measurement.

16. A machine-readable storage device as defined in claim 15, wherein the instructions, when executed, cause the machine to execute a function to define a third time relationship between the first clock and the second clock.

17. A machine-readable storage device as defined in claim 16, wherein the instructions, when executed, cause the machine to execute a tracking loop to maintain the third time relationship.

18. A machine-readable storage device as defined in claim 17, wherein executing the tracking loop comprises:
calculating an expected value of the first clock at a first time;
calculating a tracking error based on the expected value; and
comparing the tracking error to a threshold.

19. A machine-readable storage device as defined in claim 18, wherein executing the tracking loop comprises, when the tracking error exceeds the threshold, unlocking the tracking loop and estimating the function.

20. A machine-readable storage device as defined in claim 18, wherein executing the tracking loop comprises, when the tracking error does not exceed the threshold, refining the function to track any change in the third time relationship.

* * * * *